(12) United States Patent
Bülow

(10) Patent No.: US 6,795,596 B2
(45) Date of Patent: Sep. 21, 2004

(54) VARIABLE OPTICAL DELAY LINE AND USE OF THE VARIABLE OPTICAL DELAY LINE

(75) Inventor: Henning Bülow, Kornwestheim (DE)

(73) Assignee: Alcatel, Paris (FR)

(*) Notice: Subject to any disclaimer, the term of this patent is extended or adjusted under 35 U.S.C. 154(b) by 0 days.

(21) Appl. No.: 10/320,509

(22) Filed: Dec. 17, 2002

(65) Prior Publication Data
US 2003/0128906 A1 Jul. 10, 2003

(30) Foreign Application Priority Data
Jan. 8, 2002 (EP) .......................... 02360008

(51) Int. Cl.[7] .................................. G02F 1/295
(52) U.S. Cl. ........................................... 385/4
(58) Field of Search ............... 385/4, 15, 24, 385/37, 42, 122; 356/73.1; 359/127, 130, 188, 290

(56) References Cited

U.S. PATENT DOCUMENTS

| | | | |
|---|---|---|---|
| 6,185,345 B1 | 2/2001 | Singh et al. | |
| 6,222,964 B1 * | 4/2001 | Sadot et al. | 385/40 |
| 6,334,004 B1 | 12/2001 | Ohkuma et al. | |
| 6,411,756 B2 * | 6/2002 | Sadot et al. | 385/40 |
| 6,606,433 B2 * | 8/2003 | Oguma et al. | 385/37 |

FOREIGN PATENT DOCUMENTS

EP 0 909 045 A2 4/1999

OTHER PUBLICATIONS

Takiguchi K et al: "Planar lightwave circuit dispersion equaliser module with polarisation insensitive properties" Electronics Letters, IEE Stevenage, GB, Bd. 31, Nr. 1, Jan. 5, 1995, pp. 57–58.

* cited by examiner

Primary Examiner—Tu T. Nguyen
(74) Attorney, Agent, or Firm—Sughrue Mion, PLLC

(57) ABSTRACT

A variable optical delay line that has a first input (16), a first output (36), and a first phase shifter stage (10) including a first phase-shifting element (41). A first delay stage (12) is connected to the first phase shifter stage (10) and has a second phase-shifting element (44). A second phase shifter stage (14) is connected to the first delay stage (12) and has a third phase-shifting element (46). The first phase shifter stage (10), the first delay stage (12) and the second phase shifter stage (14) form a Mach-Zehnder structure, and the first, the second and the third phase-shifting elements (41, 44, 46) are driven in such a way that the variable optical delay line (100) generates a predetermined delay.

9 Claims, 2 Drawing Sheets

VARIABLE OPTICAL DELAY LINE AND USE OF THE VARIABLE OPTICAL DELAY LINE

BACKGROUND OF THE INVENTION

The invention is based on a priority application EP 02 360 008.3 which is hereby incorporated by reference. The invention relates to a variable optical delay line and the use of such a variable optical delay line.

Variable optical delay lines are needed to compensate for polarization dispersion (PMD, polarization mode dispersion) and for signal alignment in multiplexers and routers, in particular at high data rates.

Variable mechanical delay lines in which the beam path can be varied by means of mirrors mounted on motors have been disclosed for polarization compensation.

This solution is very slow and very expensive, and severe variations in the delay limit the polarization compensation in higher orders.

Furthermore, cascades of birefringent devices and polarization controllers (PCs) have been disclosed for polarization compensation. EP 0909 045 discloses a variable delay line that can also be constructed in integrated form. The variable delay line comprises a combination of asymmetric Mach-Zehnder interferometers, phase shifters modifying the delay times between the arms of the interferometers. The various individual delays are adjusted by individual controllers of the phase shifters.

Such cascades have many parameters and degrees of freedom that make adjustment difficult and expensive. Furthermore, they have a reduced power.

The object of the invention is therefore to provide a novel variable optical delay line and a use of the novel variable optical delay line.

SUMMARY OF THE INVENTION

Said object is achieved by variable optical delay line in accordance with the claims.

The variable optical delay line according to the invention makes possible a steplessly variable delay. The signal is not corrupted during the adjustment of the delay with the phase-shifting elements, which is advantageous for many applications. Any manufacturing inaccuracies are also compensated for by an optoelectrically fed-back drive for the phase controller. The feedback of the phase controller can also be designed for low velocities, which saves costs.

The object is furthermore achieved by a method in accordance with the claims.

The method has the advantage that the desired delay can be adjusted by changing only one parameter.

BRIEF DESCRIPTION OF THE DRAWINGS

Further advantageous embodiments of the invention emerge from the description below and the drawings. In the drawings:

FIG. 1 shows a variable optical delay line 100 comprising a first Mach-Zehnder interferometer 10 (MZI1), a first delay stage 12 (DEL1) and a second Mach-Zehnder interferometer 14 (MZI2).

DETAILED DESCRIPTION OF THE INVENTION

Figure 1:
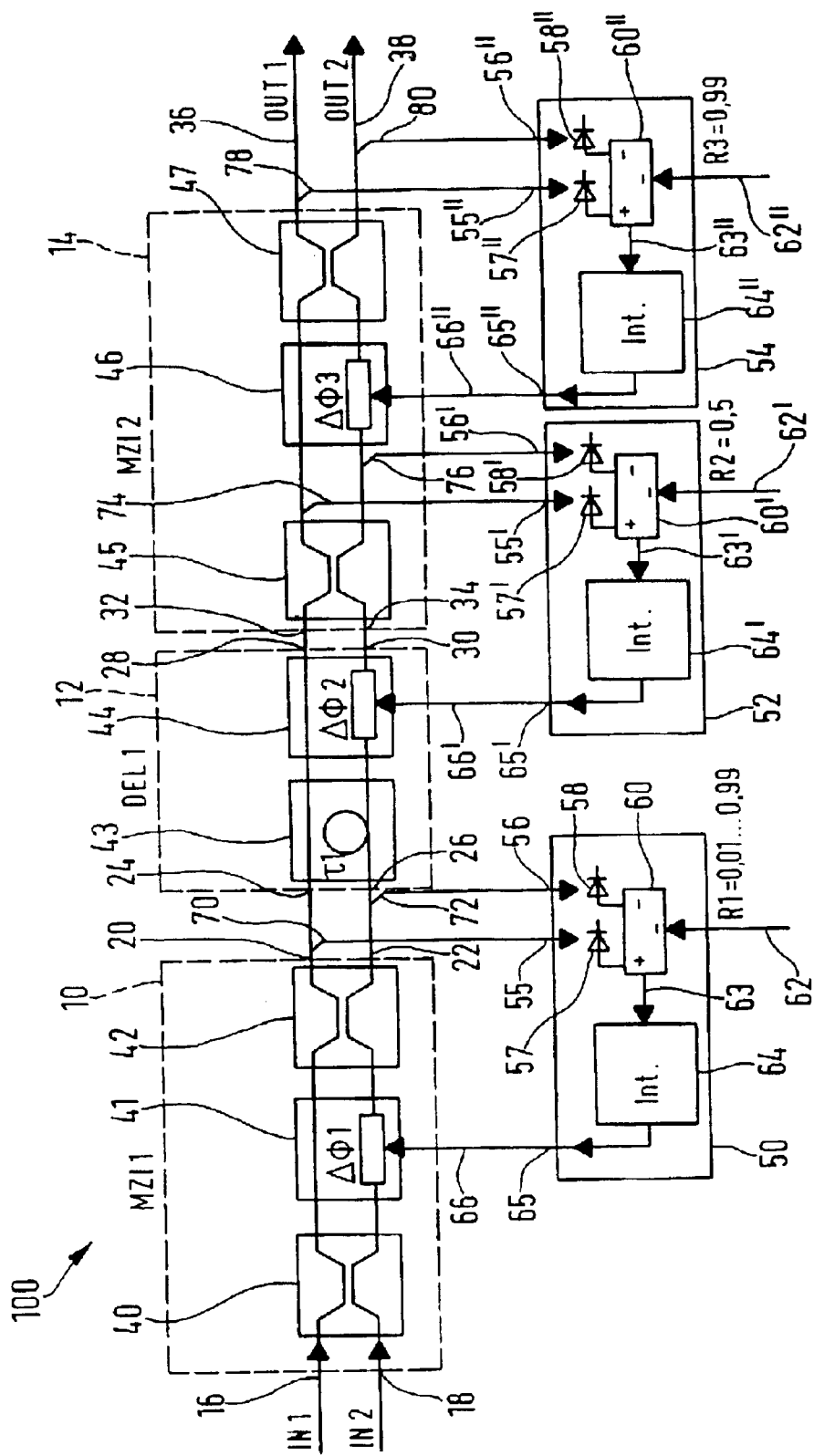
FIG. 1 shows a variable optical delay line according to the invention.

The first Mach-Zehnder interferometer 10 has two optical inputs 16 (IN1) and 18 (IN2) and two optical outputs 20 and 22.

The delay stage 12 has two optical inputs 24, 26 and two optical outputs 28, 30, the optical inputs 24, 26 being connected to the optical outputs 20, 22 of the first Mach-Zehnder interferometer 10.

The second Mach-Zehnder interferometer 14 has two optical inputs 32, 34 and two optical outputs 36 (OUT 1), 38 (OUT 2), the optical inputs 32, 34 being connected to the optical outputs 28, 30 of the first delay stage 12.

The first Mach-Zehnder interferometer 10 has two beam splitters 40, 42 and a first phase-shifting element 41 ($\Delta$PHI1) situated between the latter, the first delay stage 12 has a first delay element 43 having a fixed delay taul and a second phase-shifting element 44 ($\Delta$PHI2), and the second Mach-Zehnder interferometer 14 has two beam splitters 45, 47 and a third phase-shifting element 46 ($\Delta$PHI3) situated between the latter. The beam splitters 40, 42, 45 and 47 in the Mach-Zehnder interferometers are normally in the ratio 50% to 50%.

The first Mach-Zehnder interferometer 10, the first delay stage 12 and the second Mach-Zehnder interferometer 14 are each provided with a phase controller 50, 52 and 54, respectively.

The phase controller 50 has two optical inputs 55, 56, which are each provided with a photodiode 57, 58. A comparison element 60 is connected on the input side, on the one hand, to the photodiodes 57, 58 and, on the other hand, to a line 62, via which a setpoint value R1 is supplied. The output 63 of the comparison element 60 is connected to an integrator 64 (Int.) that emits a manipulated variable via the output 65. The phase controllers employ an optoelectrical principle.

The phase controllers 52 and 54 are similarly constructed and the corresponding reference symbols are single-primed or double-primed, for example 65' or 65", respectively.

The beam splitter 42 has an upper tap 70 at the output 20 and a lower tap 72 at the output 22. An output of the upper tap 70 is connected to the input 55 and an output of the lower tap 72 is connected to the input 56 of the phase controller 50, and the output 65 of the phase controller 50 is connected via a line 66 to the first phase-shifting element 41. The input 55 acts on the photodiode 57 and the input 56 on the photodiode 58.

The outputs of the beam splitters 45 and 47 downstream of the phase-shifting elements 44 and 46, respectively, likewise each have upper taps 74 and 78, respectively, and also lower taps 76 and 80, respectively, which are connected to the inputs of the phase controllers 52 an 54, respectively, and the phase controllers 52 and 54, respectively, are connected on the output side via the lines 66' and 66", respectively, to the phase-shifting elements 44 and 46, respectively.

A setpoint value R2 is fed to the phase controller 52 via a line 62', and a setpoint value R3 is fed to the phase controller 54 via a line 62".

Mode of Operation

The line with the optical signal to be delayed is connected to the input 16 (IN1) of the variable optical delay line 100 and the output signal is taken from the output 36 (OUT1).

The first, the second and the third phase-shifting elements (41, 44, 46) are now driven in such a way that the variable optical delay line (100) exhibits a predetermined delay tau. For this purpose, the phase-shifting elements 41, 44 and 46 are influenced or tuned by means of the phase controllers 50, 52 and 54, respectively, in such a way that the relative optical power P_rel_up=P_up/(P_up+P_down) of the upper tap 70, 74 or 78, that is to say the ratio of the power P_up of the upper tap 70, 74 or 78, respectively, to the sum P_up+P_down of the powers of the upper tap 70, 74, 78 and of the lower tap 72, 76 or 78, is in each case equal to the setpoint value R1, R2 or R3, respectively.

The setpoint value R1, R2 or R3 can be set in each case to a value between 0 and 1.

In the case of the first phase controller 50, the setpoint value R1 is set between 0 and 1. The setpoint value R2 for the second phase controller 52, is set permanently to about R2=0.5 and the setpoint value R3 for the third phase controller 54 is set permanently to about R3=0.99.

The delay element 43 acts only on the signal travelling between the input 26 and the output 30. Which component of the signal supplied at the input 16 (IN1) is delayed by the time tau1 can therefore be set by means of the setpoint value R1 and the signal at the output 36 (OUT 1) has a variable delay tau which is situated steplessly between 0 and tau1 as a function of the setpoint value R1.

The Mach-Zehnder interferometers 10, 14 may generally be described as phase shifter stages and the entire variable optical delay line 100 forms, for its part, a Mach-Zehnder structure.

The variable optical delay line 100 according to the invention using the phase controllers 50, 52 and 54 is itself a stabilizing optical arrangement, and tolerances in the production and in operation can thus be well compensated for. The variable optical delay line 100 may also be of integrated design.

In this connection, the phase controllers 50, 52 and 54 can be designed for low velocities since they have to process only the mean power of the signals supplied by the upper taps 70, 74 and 78 and by the lower taps 72, 76 and 80. This reduces the costs.

It is likewise advantageous that the delay time tau can be tuned by means of a single actuator for influencing the setpoint value R1 (one-knob tuning).

A further advantage is that the signal is not interrupted or corrupted during tuning by means of the setpoint value R1, with the result that a continuous and stepless tuning can be performed. This is a great advantage, particularly in the case of multiplexers and routers having high transfer rates.

Figure 2:
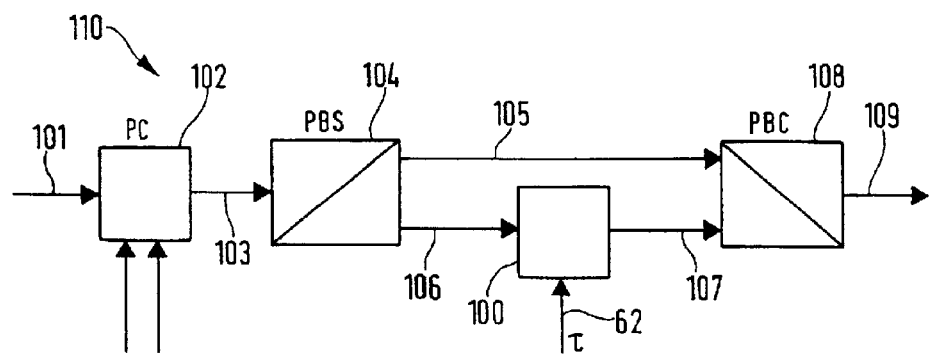
FIG. 2 shows a polarization compensator.

FIG. 2 shows the use of the variable optical delay line 100 in a polarization compensator 110 for compensating for the polarization dispersion occurring as an interfering factor in glass fibres at high transfer rates.

A glass fibre 101 is connected to a polarization controller 102 (PC). A first polarization beam splitter 104 (PBS, polarization beam splitter) is connected on the input side via a line 103 to the polarization controller 102.

The polarization beam splitter 104 is connected directly via a line 105 to a polarization beam splitter 108 acting as a beam combiner (PBC, polarization beam combiner) and via a line 106 to a variable optical delay line 100 according to the invention. The output of the variable optical delay line 100 is connected via a line 107 to the polarization beam splitter 108.

The polarization-compensated signal is emitted via an optical line 109.

Mode of Operation

The light signal in optical fibres has polarization directions along two main polarization axes, the propagation velocity of the light signal for one polarization direction along the one main axis being greater than for a polarization direction along the other main axis. This expands the light signal. The expansion is produced by the time shift of the two signals having different polarization directions with respect to one another and is measured by means of the differential group delay (DGD). The differential group delay is normally specified in $\mu$s or, for high transfer rates, in ps. The polarization controller 102 sets the polarization of the light signal supplied via the line 101 in such a way that the polarization directions along the two main polarization axes are separated in the polarization beam splitter 104 in such a way that the polarization direction along the first main polarization axis having the slower propagation velocity is supplied via the upper line 105 directly to the polarization beam splitter 108, whereas the other polarization direction along the second main polarization axis having the faster propagation velocity is passed through the variable optical delay line 100. The setpoint value R1 can now be set via the line 62 in such a way that the two component signals travelling via the lines 105 and 106 are aligned to DGD=0 ps.

The aligned component signals are combined again in the polarization beam divider 108 and forwarded via the line 109.

Coupling a plurality of polarization compensators 110 behind one another makes possible a higher-order polarization compensation.

Such a polarization compensator 110 may also be of completely integrated construction.

The reduced number of parameters and the avoidance of changes in the phase delay results in a rapid and, in particular for higher-order polarization compensations, effective polarization compensation.

The variable optical delay line may preferably also be used for optical receivers, optical multiplexers and optical routers. In these cases, the stepless setting without corrupting the signal, in particular, is advantageous.

Figure 3:
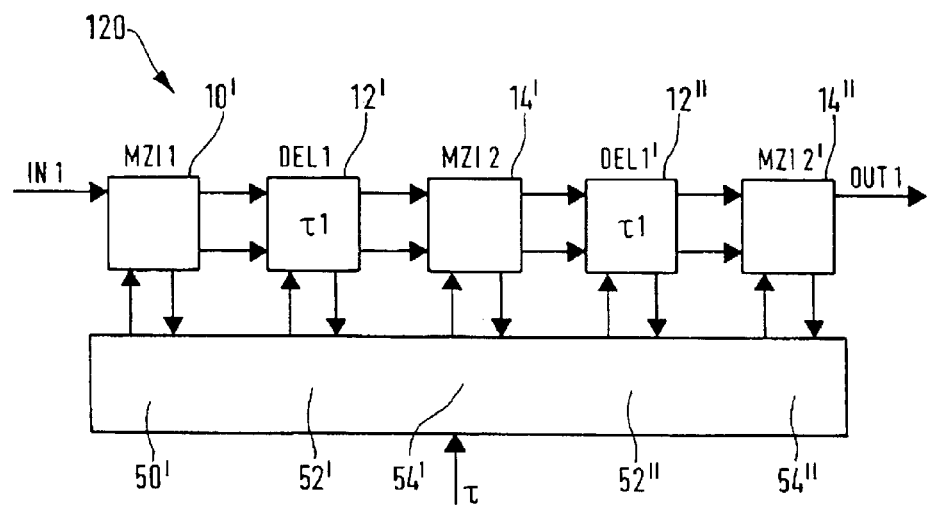
FIG. 3 shows a further embodiment of a variable optical delay line.

FIG. 3 shows a variable optical delay line 120 that, like the variable delay line 100, has a first Mach-Zehnder interferometer 10' (MZI1), a delay stage 12' (DEL1) and a second Mach-Zehnder interferometer 14' (MZI2).

Disposed behind the second Mach-Zehnder interferometer 14' is, in addition, a second delay stage 12" (DEL1') and a third Mach-Zehnder interferometer 14" (MZI2').

Phase controllers 50', 52', 54', 52", 54" are assigned in each case to the associated phase shifters.

Mode of Operation

In this exemplary embodiment, the delay stages 12' and 12" each have a fixed delay of tau1. Since the delay tau1 of a delay stage should not exceed about one third of the optical bandwidth of the signal, a greater maximum total delay is achieved by cascading. The additional arrangement comprising the second delay stage 12" and the third phase shifter stage 14" achieves the result that the total delay tau can be chosen with the arrangement 120 variably between 0 and 2*tau1. A doubling of the maximum total delay is therefore achieved.

The maximum total delay tau can be increased further after phase tuning has taken place by adding further such arrangements each having a delay stage with fixed delay and a phase shifter stage. The maximum total delay tau is given by the sum of all the fixed delay times and can be set via a single actuator.

What is claimed is:

1. A variable optical signal delay line, comprising:
at least a first input (16) and at least a first output, a first phase shifter stage coupled to said first input and having a first phase shifting element, a first delay stage that is connected to the first phase shifter stage and has a second phase-shifting element, and a second phase shifter stage, coupled to said first output, connected to the first delay stage, and having a third phase-shifting element, wherein the first phase shifter stage, the first delay stage and the second phase shifter stage are each constructed in the fashion of a Mach-Zehnder interferometer with a beam divider and a first and a second arm, wherein the first, second and third phase-shifting elements are tuned by means of a respective phase controller in the second arm of each said interferometer, so that the ratio of the optical power in the first arm to the sum of the optical powers in the first and second arms in each said interferometer is equal to a setpoint value R1, R2 and R3, respectively, wherein R1 for the first phase controller is set between 0 and 1, R2 for the second phase controller is set to about 0.5, and R3 for the third phase controller is set to about 0.99, and wherein only the setpoint value R1 of the first phase-shifting element is varied so that the signal delay lies between 0 and a delay produced by said first delay stage, and the setpoint values R2 and R3 of the second and third phase-shifting elements are fixed.

2. The variable optical signal delay line according to claim 1, wherein the phase controllers operate optoelectrically.

3. The variable optical signal delay line according to claim 1, wherein the first delay stage has a fixed delay.

4. The variable optical signal delay line according to claim 1, wherein the second phase shifter stage is followed by at least one further arrangement comprising a second delay stage and a third phase shifter stage.

5. A method employing a variable optical signal delay line comprising: at least a first input (16) and at least a first output, a first phase shifter stage coupled to said first input and having a first phase shifting element, a first delay stage that is connected to the first phase shifter stage and has a second phase-shifting element, and a second phase shifter stage, coupled to said first output, connected to the first delay stage, and having a third phase-shifting element, wherein the first phase shifter stage, the first delay stage and the second phase shifter stage are each constructed in the fashion of a Mach-Zehnder interferometer with a beam divider and a first and a second arm, and wherein the first, second and third phase-shifting elements are tuned by means of a respective phase controller in the second arm of each said interferometer, so that the ratio of the optical power in the first arm to the sum of the optical powers in the first and second arms in each said interferometer is equal to a setpoint value R1, R2 and R3, respectively, and R1 for the first phase controller is set between 0 and 1, R2 for the second phase controller is set to about 0.5, and R3 for the third phase controller is set to about 0.99, said method comprising:

A) varying only the setpoint value R1 of the first phase-shifting element so that the signal delay lies between 0 and a delay produced by said first delay stage, and B) operating the second and third phase-shifting elements with fixed setpoint values R2 and R3.

6. An optical receiver comprising: a variable optical signal delay line for signal delay, said delay line comprising: at least a first input (16) and at least a first output, a first phase shifter stage couple to said first input and having a first phase shifting element, a first delay stage that is connected to the first phase shifter stage and has a second phase-shifting element, and a second phase shifter stage, coupled to said first output, connected to the first delay stage, and having a third phase-shifting element, wherein the first phase shift stage, the first delay stage and the second phase shifter stage are each constructed in the fashion of a Mach-Zehnder interferometer with a beam divider and a first and a second arm, wherein the first, second and third phase-shifting elements are tuned by means of a respective phase controller, in the second arm of each said interferometer, so that the ratio of the optical power in the first arm to the sum of the optical powers in the first and second arms in each said interferometer is equal to setpoint value R1, R2 and R3, respectively, and R1 for the first phase controller is set between 0 and 1, R2 for the second phase controller is set to about 0.5, and R3 for the third phase controller is set to about 0.99, and wherein only the setpoint value R1 of the first phase-shifting element is varied so that the signal delay lies between 0 and a delay produced by said first delay stage, and the setpoint values R2 and R3 of the second and third phase-shifting elements are fixed.

7. A polarization dispersion compensator comprising: a variable optical signal delay line for signal delay, said delay line comprising: at least a first input (16) and at least a first output, a first phase shifter stage coupled to said first input and having a first phase shifting element, a first delay stage that is connected to the first phase shifter stage and has a second phase-shifting element, and a second phase shifter stage, coupled to said first output, connected to the first delay stage, and having a third phase-shifting element, wherein the first phase shifter stage, the first delay stage and the second phase shifter stage are each constructed in the fashion of a Mach-Zehnder interferometer with a beam divider and a first and a second arm, and wherein the first, second and third phase-shifting elements are tuned by means of a respective phase controller in the second arm of each said interferometer, so that the ratio of the optical power in the first arm to the sum of the optical powers in the first and second arms in each said interferometer is equal to setpoint value R1, R2 and R3, respectively, and R1 for the first phase controller is set between 0 and 1, R2 for the second phase controller is set to about 0.5, and R3 for the third phase controller is set to about 0.99, and wherein only the setpoint value R1 of the first phase-shifting element is varied so that the signal delay lies between 0 and a delay produced by said first delay stage, and the setpoint values R2 and R3 of the second and third phase-shifting elements are fixed.

8. An optical multiplexer comprising: a variable optical signal delay line for signal delay, said delay line comprising: at least a first input (16) and at least a first output, a first phase shifter stage coupled to said first input and having a first phase shifting element, a first delay stage that is connected to the first phase shifter stage and has a second phase-shifting element, and a second phase shifter stage, coupled to said first output, connected to the first delay stage, and having a third phase-shifting element, wherein the first phase shifter stage, the first delay stage and the second phase shifter stage are each constructed in the fashion of a Mach-Zehnder interferometer with a beam divider and a first and a second arm, wherein the first, second and third phase-shifting elements are tuned by means of a respective phase controller in the second arm of each said interferometer, so that the ratio of the optical power in the first arm to the sum of the optical powers in the first and second arms in each said interferometer is equal a setpoint value R1, R2 and R3, respectively, and R1 for the first phase controller is set between 0 and 1, R2 for the second phase controller is set to about 0.5, and R3 for the third phase controller is set to about 0.99, and wherein only the setpoint value R1 of the first phase-shifting element is varied so that the signal delay lies between 0 and a delay produced by said first delay stage, and the setpoint values R2 and R3 of the second and third phase-shifting elements are fixed.

9. An optical router comprising: a variable optical signal delay for signal delay, said delay line comprising: at least a first input (16) and at least a first output, a first phase shifter stage coupled to said first input and having a first phase shifting element, a first delay stage that is connected to the first phase shifter stage and has a second phase-shifting element, and a second phase shifter stage, coupled to said first output, connected to the first delay stage, and having a third phase-shifting element, wherein the first phase shifter stage, the first delay stage and the second phase shifter stage are each constructed in the fashion of a Mach-Zehnder interferometer with a beam divider and a first and a second arm, wherein the first, second and third phase-shifting elements are tuned by means of a respective phase controller in the second arm of each said interferometer, so that the ratio of the optical power in the first arm to the sum of the optical powers in the first and second arms in each said interferometer is equal a setpoint value R1, R2 and R3, respectively, and R1 for the first phase controller is set between 0 and 1, R2 for the second phase controller is set to about 0.5, and R3 for the third phase controller is set to about 0.99, and wherein only the setpoint value R1 of the first phase-shifting element is varied so that the signal delay lies between 0 and a delay produced by said first delay stage, and the setpoint values R2 and R3 of the second and third phase-shifting elements are fixed.

* * * * *